United States Patent
Yanagisawa

(10) Patent No.: US 10,061,569 B2
(45) Date of Patent: Aug. 28, 2018

(54) METHOD AND APPARATUS FOR SOLVING A MIXED INTEGER PROGRAMMING PROBLEM

(71) Applicant: INTERNATIONAL BUSINESS MACHINES CORPORATION, Armonk, NY (US)

(72) Inventor: Hiroki Yanagisawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/812,213

(22) Filed: Jul. 29, 2015

(65) Prior Publication Data
US 2017/0031664 A1 Feb. 2, 2017

(51) Int. Cl.
*G06F 9/45* (2006.01)
*G06F 8/41* (2018.01)

(52) U.S. Cl.
CPC .................... *G06F 8/443* (2013.01)

(58) Field of Classification Search
CPC ...................................................... G06F 8/443
See application file for complete search history.

(56) References Cited

U.S. PATENT DOCUMENTS

| | | | |
|---|---|---|---|
| 2003/0105656 A1* | 6/2003 | Thengvall | G06Q 10/02 705/7.21 |
| 2009/0271241 A1* | 10/2009 | Pratt | G06Q 10/063 705/7.11 |
| 2011/0131167 A1* | 6/2011 | Achterberg | G06F 17/11 706/46 |
| 2013/0246032 A1* | 9/2013 | El-Bakry | G06F 17/5009 703/10 |
| 2014/0128996 A1* | 5/2014 | Sayyarrodsari | G05B 17/02 700/29 |
| 2014/0164171 A1* | 6/2014 | Lu | G06Q 30/0207 705/26.7 |
| 2014/0303792 A1* | 10/2014 | Tsuzaki | G05D 9/12 700/281 |
| 2015/0331833 A1* | 11/2015 | Lustig | G06F 17/11 708/207 |

FOREIGN PATENT DOCUMENTS

JP 5114675 B2 1/2013

OTHER PUBLICATIONS

Yao et al. "A Design Flow for Linear-.Phase Fixed-Point Fir Filters: From the NPRM Specifications to a VHDL Code" 2003.*

* cited by examiner

*Primary Examiner* — Viva Miller
(74) *Attorney, Agent, or Firm* — Tutunjian & Bitetto, P.C.; Vazken Alexanian

(57) ABSTRACT

A method, apparatus and computer program product for solving a mixed integer programming problem. The apparatus includes a generating section configured to generate a relaxed mixed integer programming problem by relaxing each of only a part of integer variables of the mixed integer programming problem to a continuous variable, a solver configured to solve the relaxed mixed integer programming problem, and a determining section configured to determine, using a processor, a feasible solution of the mixed integer programming problem based on a solution of the relaxed mixed integer programming problem.

13 Claims, 6 Drawing Sheets

METHOD AND APPARATUS FOR SOLVING A MIXED INTEGER PROGRAMMING PROBLEM

BACKGROUND

Technical Field

The present invention relates to a method and apparatus for solving a mixed integer programming problem.

Related Art

Since most combinatorial optimization problems are described as Mixed Integer Programming (or MIP) problems, it is important to solve MIP problems in a short amount of time in business. Linear Programming Relaxation (or LPR) has been used for solving MIP problems. According to LPR, all integer variables in the original MIP problem are relaxed to continuous variables, and the relaxed problem is solved to obtain information about the optimum solution of the original MIP problem. However, it still takes a long time to obtain an accurate solution for the original MIP problem, since it is often the case that the solution of the relaxed problem is not close to the solution of the original MIP problem.

SUMMARY

A first aspect of the present principles may include an apparatus for solving a mixed integer programming problem comprising a generating section, a solver, and a determining section. The generating section is configured to generate a relaxed mixed integer programming problem by relaxing each of only a part of integer variables of the mixed integer programming problem to a continuous variable. The solver is configured to solve the relaxed mixed integer programming problem. The determining section is configured to determine a feasible solution of the mixed integer programming problem based on a solution of the relaxed mixed integer programming problem.

A second aspect of the present principles may include a method for solving a mixed integer programming problem. In an embodiment, the method may include generating a relaxed mixed integer programming problem by relaxing each of only a part of integer variables of the mixed integer programming problem to a continuous variable, solving the relaxed mixed integer programming problem, and determining a feasible solution of the mixed integer programming problem based on a solution of the relaxed mixed integer programming problem. In one embodiment, the method may include a computer-implemented method performed by the apparatus of the first aspect. A third aspect of the invention may include a computer program product comprising a non-transitory computer readable storage medium having program instructions embodied therewith, the program instructions executable by a computer to cause the computer to perform the method of the second aspect.

The summary clause does not necessarily describe all necessary features of the embodiments of the present principles. The present principles may also be a sub-combination of the features described above. The above and other features and advantages of the present principles will become more apparent from the following detailed description of illustrative embodiments thereof, which is to be read in conjunction with the accompanying drawings.

DETAILED DESCRIPTION OF PREFERRED EMBODIMENTS

Hereinafter, example embodiments of the present principles will be described in detail with reference to the attached drawings. The example embodiments shall not limit the claims, and the combinations of features described in the example embodiments are not necessarily essential to the present principles. Advantages and/or effects described in a given example embodiment are not necessarily required in the other embodiments. It should be understood that the present principles may be implemented with various modifications within the scope of the present invention.

Figure 1:
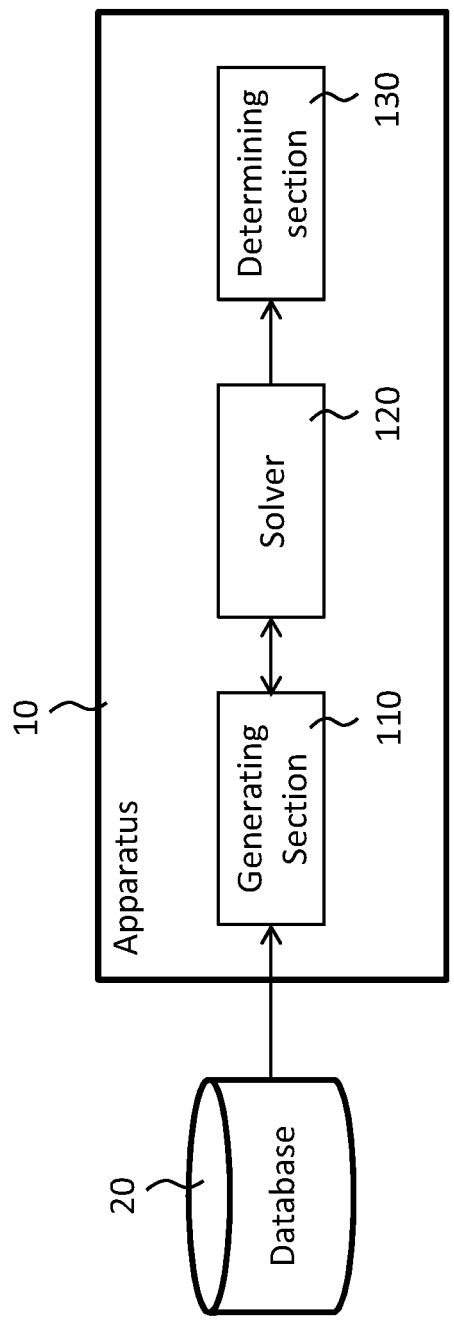
FIG. 1 shows a block diagram of an exemplary apparatus for solving a mixed integer programming problem, according to an embodiment of the present principles.

FIG. 1 shows a block diagram of an apparatus 10 for solving a mixed integer programming problem, according to an embodiment of the present principles. In one embodiment, the apparatus 10 solves a MIP problem by partially relaxing integer variables of the MIP problem. In another embodiment, the apparatus 10 may also solve an Integer Programming (or IP) problem by partially relaxing a part of integer variables of the IP problem. The apparatus 10 comprises a generating section 110, a solver 120, and a determining section 130.

The generating section 110 is connected to a database 20 through wires or wirelessly, and receives an original MIP problem from the database 20. The generating section 110 may firstly generate a partially relaxed mixed integer programming (or partially relaxed MIP) problem by relaxing each of only a part of integer variables of the original MIP problem to a continuous variable, such as a real variable.

The generating section 110 may directly or indirectly connect to the solver 120 and may provide the solver 120 with the partially relaxed MIP problem. The generating section 110 may receive a solution of the partially relaxed MIP problem from the solver 120.

Then the generating section 110 may perform a branching of a branch-and-bound algorithm. For example, the generating section 110 may further generate a sub-problem of the partially relaxed MIP problem based on the solution provided by the solver 120. In the sub-problem, at least one continuous variable relaxed from integer variables has fixed integer values as the result of the branching. The generating section 110 generates the sub-problems such that the sub-problems have non-relaxed integer variables. In other words, non-relaxed integer variables may remain in the sub-problems and need not be fixed. The generating section 110 may provide the solver 120 with the generated sub-problem.

The generating section 110 can include a circuit, a shared or dedicated computer readable medium storing computer readable program instructions executed by a shared or dedicated processor, etc., as well as a modem, a LAN interface, a wireless LAN interface, or any other wired or wireless communication interface.

The solver 120 solves the partially relaxed MIP problem. The solver 120 may solve the partially relaxed MIP problem generated directly from the original MIP problem, and sub-problems generated directly or indirectly from the partially relaxed MIP problem.

The solver 120 may provide the generating section 110 with a solution of the partially relaxed MIP problem and solutions of the sub-problems. The solver 120 may also provide the determining section 130 with the solution of the partially relaxed MIP problem and the solutions of the sub-problems. The solver 120 can include a circuit, a shared or dedicated computer readable medium storing computer readable program instructions executed by a shared or dedicated processor, etc.

The determining section 130 determines a feasible solution of the MIP problem based on the solutions of the partially relaxed MIP problem and the sub-problems. For example, the determining section 130 may select a solution (or solutions) that is/are feasible as the solution of the original MIP problem, among the solutions of the partially relaxed MIP and the sub-problems provided by the solver 120. In an embodiment, the feasible solution must have the same integer variable set and continuous variable set as variable sets of the original MIP problem. The determining section 130 may select the best solution (e.g., the most optimized solution) of the original MIP among the feasible solutions.

The determining section 130 can include a circuit, a shared or dedicated computer readable medium storing computer readable program instructions executed by a shared or dedicated processor, etc.

As described above, the apparatus 10 generates the partially relaxed MIP problem by relaxing only a part of integer variables. Since the solver 120 can complete the branch-and-bound procedure without branching all integer variables, the apparatus 10 can find the solution of the original MIP problem in a short amount of time.

Figure 2:
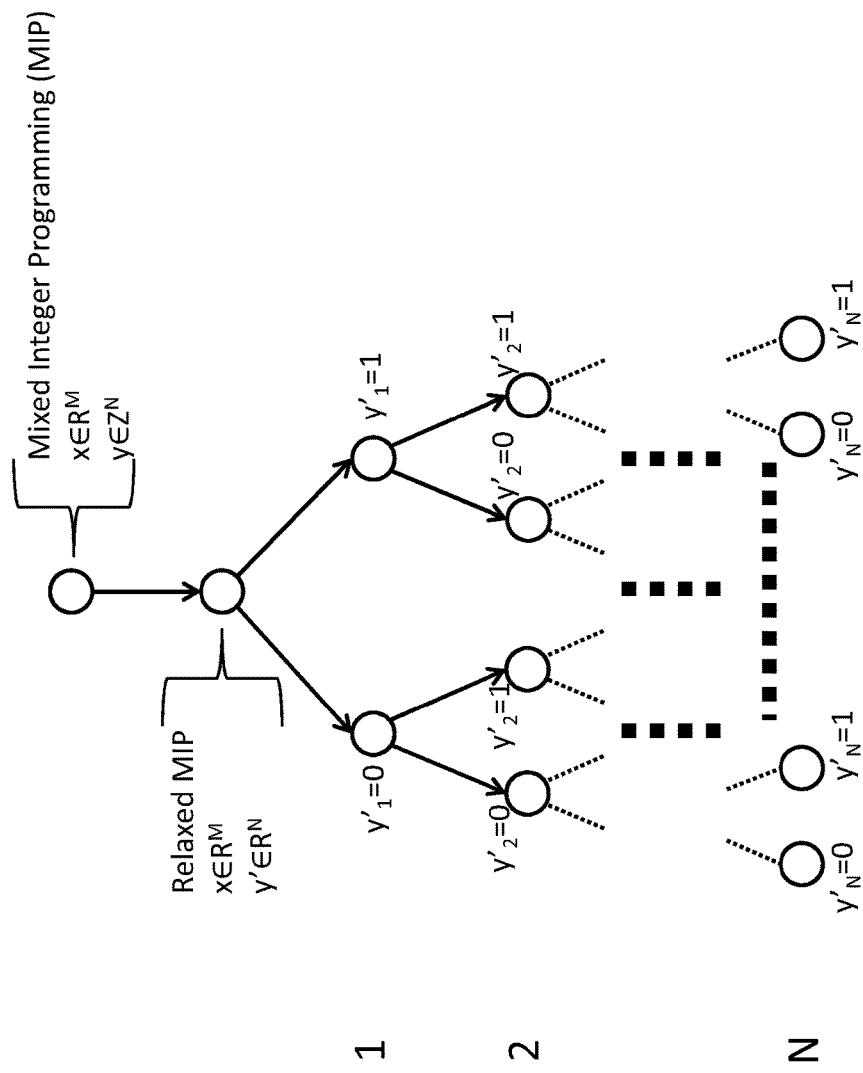
FIG. 2 shows a tree generated, according to related art.

FIG. 2 shows a tree generated according to related art. In the related art, all integers of the original MIP problem are relaxed. In FIG. 2, the original MIP problem contains a real vector "x" which comprises M continuous variable elements $x_m$ ($1 \leq m \leq M$), and an integer vector "y" which comprises N integer variable elements $y_n$ ($1 \leq n \leq N$). In the embodiment, the integer variable $y_n$ may be defined as $y_n = \{0, 1\}$. In FIG. 2, all n integer variables of the vector "y" are relaxed to N continuous variables. The resultant relaxed MIP problem contains the real vector "x" which comprises M continuous variables $x_m$ and a real vector "y" which comprise N continuous variables $y'_n$.

The relaxed MIP problem is solved by utilizing the branch-and-bound algorithm. In the branch-and-bound algorithm, each $y'_n$ is split to 0 and 1. N layers may be generated by branching all elements of the real vector $y'_n$.

Figure 3:
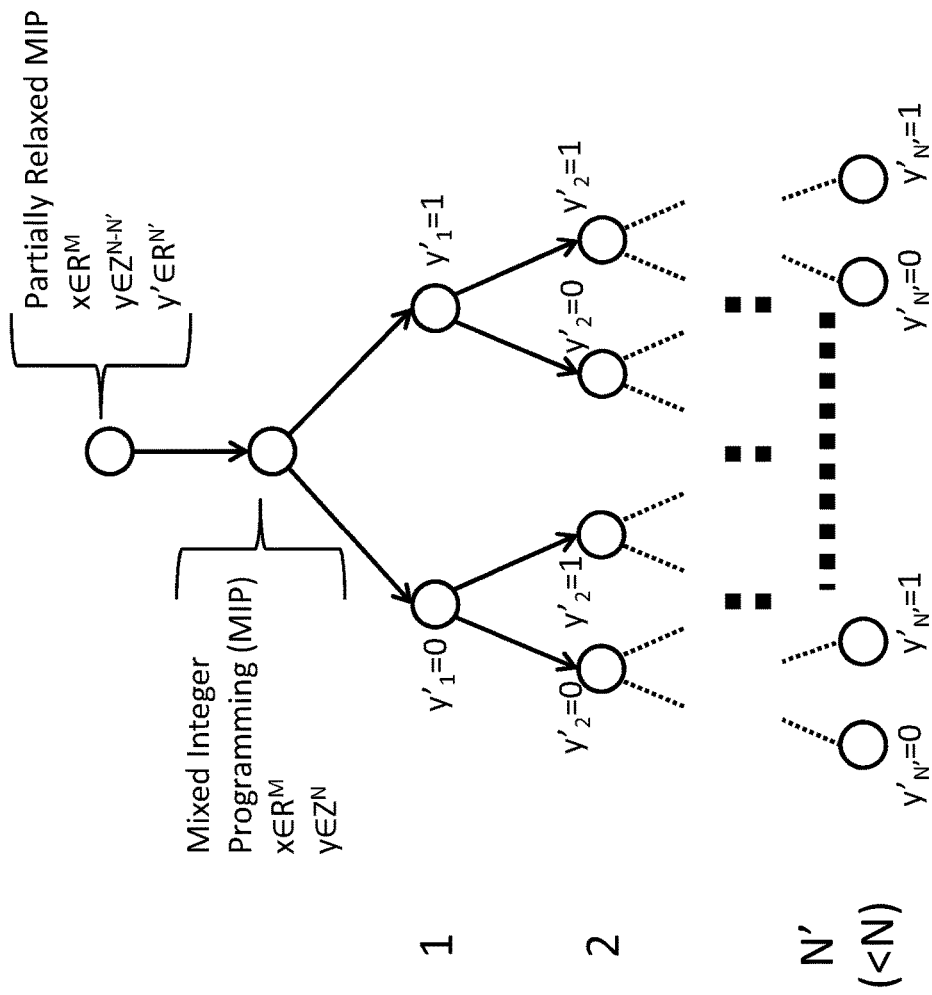
FIG. 3 shows a tree generated, according to an embodiment of the present principles.

FIG. 3 shows a tree generated according to an embodiment of the present principles. According to an embodiment of the present principles, only part of the integers of the original MIP problem are relaxed. The original MIP problem in FIG. 3 is the same as that of FIG. 2. In an embodiment, as illustrated in FIG. 3, only part of the N integer variables of the vector "y" are relaxed to continuous variables. For example, N' integer variables (N'<N) are relaxed to N' continuous variables, and N-N' integer variables remain unrelaxed. The resultant partially relaxed MIP problem contains the real vector "x" which comprises M continuous variables $x_m$, an integer vector "y" which comprise N-N' integer variables $y_n$, and a real vector "y" which comprise N' continuous variables $y'_n$.

The partially relaxed MIP problem can be solved by utilizing the branch-and-bound algorithm. In the branch-and-bound algorithm, each $y'_n$ is split to 0 and 1. N' layers may be generated by branching all elements of the real vector $y'_n$. Since N' is smaller than N, the apparatus of the embodiment of FIG. 3 may complete the search for a solution of the original MIP problem with the branch-and-bound algorithm in a shorter amount of time than in the related art, as shown in FIG. 2.

Figure 4:
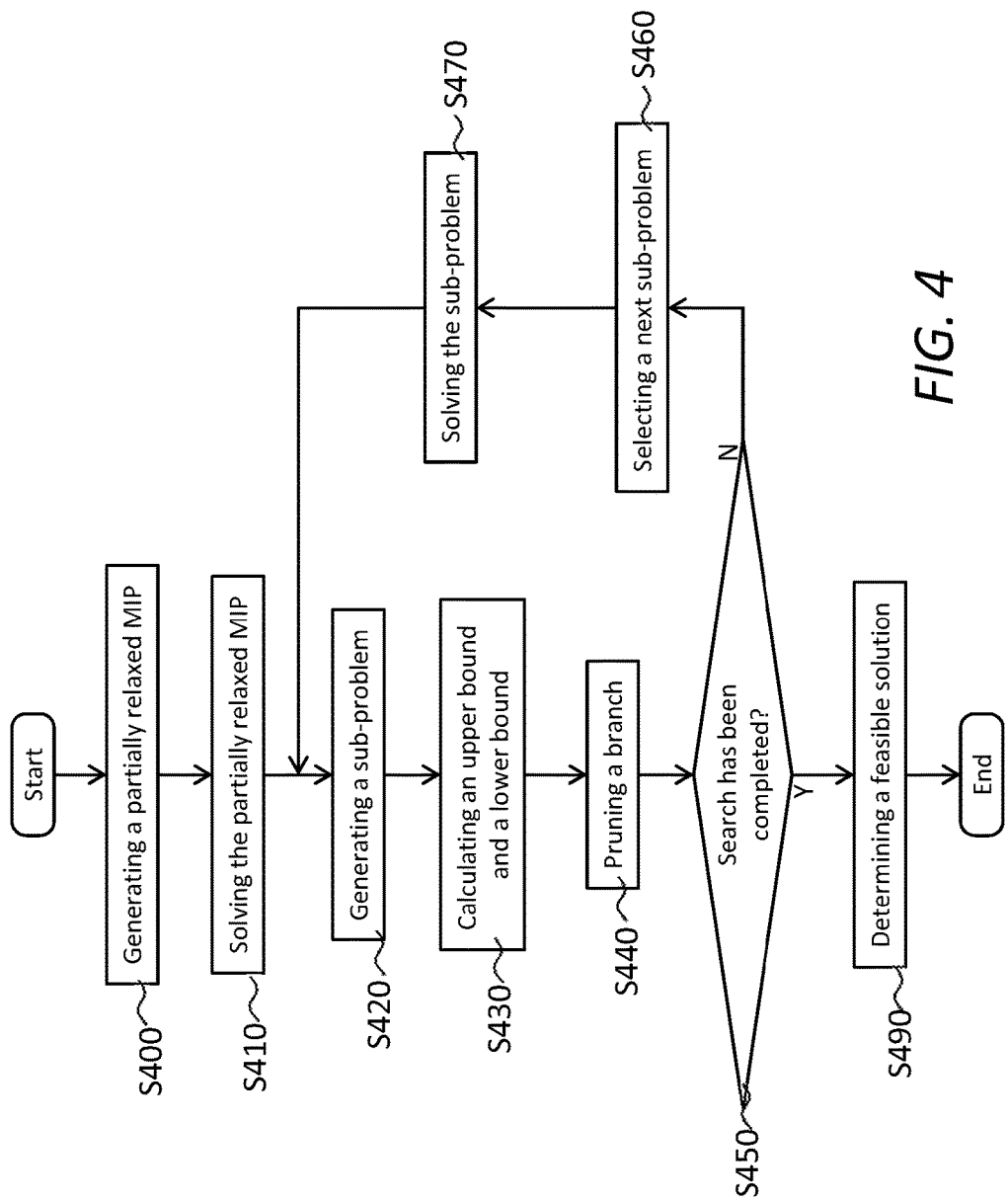
FIG. 4 shows a flowchart illustrating an exemplary method for solving a mixed integer programming problem, according to an embodiment of the present principles.

FIG. 4 shows a flowchart illustrating an exemplary method for solving a mixed integer programming problem, according to an embodiment of the present principles. In this embodiment, an apparatus, such as apparatus 10 of FIG. 1, may perform a method comprising steps S400-S490. In the embodiment shown in FIG. 4, the apparatus 10 treats an MIP problem that includes an objective function to be minimized, and constraints. In other words, the optimal solution of the MIP problem enables the objective function to output the minimal value under the constraints. Another type of objective function can be used instead of this embodiment.

In this embodiment, each integer variable in the MIP may have a value of 0 or 1, and continuous variables may have a real number value between 0 and 1 in the MIP problem. In the embodiment, the objective function can be "min cx plus dy" where c and d are constant vectors comprising constant elements, and the constraints can be "Ax+By>b" where A and B are constant matrices comprising constant elements and b is a constant vector. However, other implementations are possible as an MIP problem.

At step S400, the generating section 110 obtains an original MIP problem. In an embodiment, the generating section 110 receives the original MIP from the database 20. The generating section may receive the original MIP from other entities, such as a storage device (not shown in FIG. 1) in the apparatus 10, or from a user. The original MIP problem includes one or more integer variables and one or more continuous variables.

The generating section 110 generates a partially relaxed MIP problem by relaxing each of only a part of integer variables of the original MIP problem to a continuous variable. For example, the generating section 110 keeps a predetermined number of the integer variables of the MIP problem not relaxed, and relaxes at least one other integer variable of the original MIP problem to at least one continuous variable. Specifically, the generating section 110 keeps less than ten integer variables, preferably less than four integer variables of the original MIP problem not relaxed.

The generating section 110 may select only the part of integer variables of the original MIP problem for relaxation such that the objective function of the partially relaxed MIP problem exhibits discrete convexity for each of at least one of the integer variables. When the objective function of the partially relaxed MIP problem exhibits discrete convexity, the partially relaxed MIP problem can be called a mixed discrete convex programming and can be solved in polynomial time.

In one embodiment, the generating section 110 may receive selection of the part of the integer variables for relaxation from a user. The generating section 110 may select such integer variable(s) for relaxation by determining that not-relaxed integer variable(s) exhibits M-convexity, M-natural-convexity, L-convexity, or L-natural-convexity in relation to the partially-relaxed MIP problem.

If only one integer variable remains as an integer and other integer variables are relaxed to continuous variables, the objective function of the resultant MIP problem must have discrete convexity. Therefore, in one embodiment, the generating section 110 may keep one integer variable of the original MIP problem not relaxed and relaxes other integer variables to continuous variables. The generating section 110 provides the solver 120 with the partially relaxed MIP problem. Then, the generating section moves to step S410.

At step S410, the solver 120 solves the partially relaxed MIP problem generated at step S400. For example, the solver 120 may solve the partially relaxed MIP problem as a mixed discrete convex programming problem. The solver 120 may solve the mixed discrete convex programming problem by utilizing a local search algorithm, a domain reduction algorithm, and/or a scaling algorithm. The solver 120 may solve the partially relaxed MIP problem in polynomial time by utilizing these algorithms.

The solver 120 may provide the solution of the partially relaxed MIP problem to the generating section 110. The generating section 110 may calculate an upper bound and a lower bound of the original MIP problem. The solver 120 moves to step S420.

At step S420, the generating section 110 generates new sub-problems of an object node. The object node is a current object problem of the generating section 110. If the last step is step S410, then the object node is the partially relaxed MIP problem. If the last step is step S470, then the object node is the sub-problem selected at the most recent step S460.

In other words, the generating section 110 performs a branching of the branch-and-bound algorithm. Newly generated branches may correspond to the generated sub-problems.

The generating section 110 may generate sub-problems of the object node (the partially relaxed MIP problem or the sub-problem) obtained at step S410 or step S470, by allocating fixed integer values to continuous variables relaxed from integer variables. In an embodiment, the generating section 110 may select one continuous variable from the relaxed integer variables that were relaxed at step S400.

The generating section 110 may select the one continuous variable that has not yet been selected at the object node. The generating section 110 need not select a continuous variable from the original continuous variables, which exist in the original MIP problem. Then the generating section 110 may generate the sub-problems by allocating different integer values (e.g., "0" and "1") to the selected continuous variable. Since the sub-problems still have both integer variables and continuous variables, the sub-problems can be regarded as an MIP problem.

The generating section 110 may allocate all or a part of the possible integer values to the relaxed integer variable to generate all or a part of the possible sub-problems. The generating section 110 may determine an allocating value based on a value of a corresponding relaxed continuous variable in the solution of the object node. In one embodiment, if the solution of the node indicates that the relaxed integer variable $y'_1$ is 0.8, then the generating section 110 may generate a sub-problem of the node where the relaxed integer variable $y'_1$ has a value of 1 rather than 0.

In the example illustrated in FIG. 3, the generating section 110 selects the relaxed integer variable $y'_1$ at the 1st layer for branching. The generating section 110 moves to step S430. In an embodiment, the generating section 110 may not generate new sub-problems when it is not possible. In this case, the generating section 110 may skip to step S450.

At step S430, the generating section 110 calculates an upper bound and a lower bound of the objective values of the sub-problems generated at step S420. In this embodiment, the upper bound may be the objective value of the best solution found so far during the execution of this algorithm, and the lower bound may be a value that is guaranteed to be equal or less than the objective value of the optimum solution. The generating section 110 may keep the upper bounds and lower bounds of all nodes, and/or may further calculate and keep a global upper bound and a global lower bound. The generating section 110 moves to step S440.

At step S440, the generating section 110 prunes the branch(es) corresponding to the sub-problems generated at step S420. In one embodiment, the generating section 110 may determine whether the lower bound of a sub-problem is larger than the upper bound of other sub-problems (branches) and/or greater than the global upper bound. If the decision is positive, then the generating section 110 may discard the sub-problem(s) of which the lower bound is greater than the upper bound of the other sub-problems.

Through steps S420-S440, the generating section 110 can generate the sub-problem if a predicted range of an objective function of the sub-problem (e.g., a range between the lower bound and the upper bound of the object node) overlaps a required range (e.g., a range between the lower bound and the upper bound of other sub-problems) of an objective function of the MIP problem. The generating section 110 moves to step S450.

At step S450, the generating section 110 determines whether the search has been completed. In one embodiment, the generating section 110 determines whether all branches (nodes) have been branched or pruned. The generating section 110 moves to step S490 if the decision is positive (e.g., Yes at step S450), and moves to step S460 if the decision is negative (e.g., No at step S450).

At step S460, the generating section 110 selects the next sub-problem from among sub-problems that have not been solved and sub-problems of which all branches have not been developed. The generating section 110 may select the next sub-problem based on a depth-first search or breadth-first search.

The generating section 110 may select the next sub-problem based on a value of a corresponding relaxed continuous variable in the solution of the current object node. In one embodiment, if the solution of the current node indicates that the relaxed integer variable $y'_1$ is 0.8, then the generating section 110 may select a sub-problem of which the relaxed integer variable $y'_1$ has a value of 1, rather than a sub-problem of which the relaxed integer variable $y'_1$ has a value of 0, because 1 is closer to 0.8 than 0. The generating section 110 moves to step S470.

At step S470, the solver 120 solves the sub-problem selected at step S460. The sub-problem has the same original continuous variable(s) as the original MIP problem, non-relaxed integer valuable(s), and the relaxed integer valuable(s) that are not allocated the fixed integer values. The solver 120 may solve the sub-problem in the same manner as step S410. The solver provides the generating section with the solutions of the sub-problems. The solver 120 moves to step S420.

At step S490, the determining section 130 determines a feasible solution of the original MIP problem based on the solution of the partially relaxed MIP problem obtained at step S410 and solutions of the sub-problems obtained at step S470. In one embodiment, the determining section 130 determines that the solution of the partially relaxed MIP problem is to be the solution of the original MIP problem if each of at least one of the continuous variables relaxed from each of at least one of the integer variables is calculated to be an integer value in the solution of the partially relaxed MIP problem. The determining section 130 may determine the best solution (e.g., the most optimized solution) for the original MIP problem from among the feasible solutions.

As explained with regards to FIG. 4, the apparatus 10 generates a partially relaxed MIP problem and sub-problems thereof by generating section 110. The apparatus 10 can solve these problems by utilizing the discrete convexity by the solver 120. Since the apparatus 10 needs branches for only a part of the original integer variables, the apparatus 10 can search the optimum solution of the original MIP problem in a shorter time.

Figure 5:
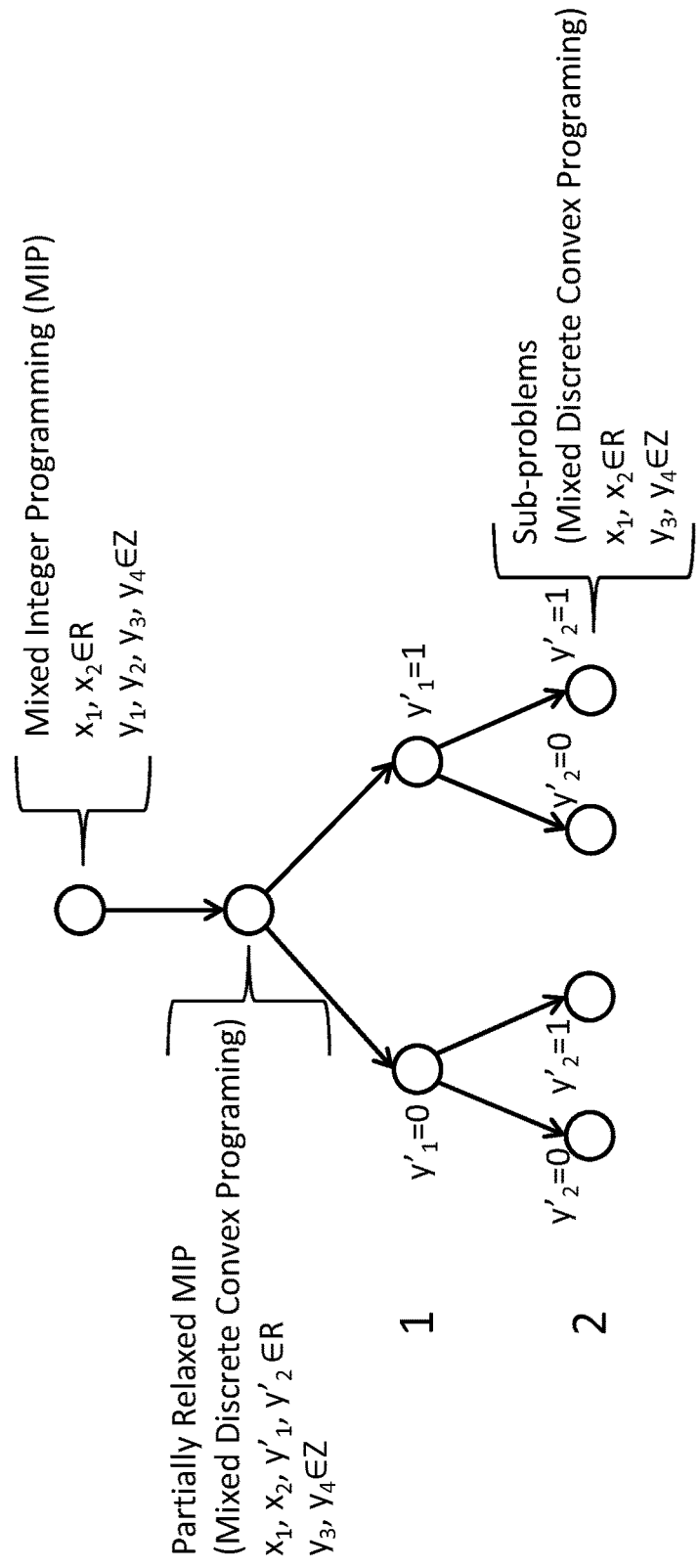
FIG. 5 shows a specific tree generated, according to an embodiment of the present principles.

FIG. 5 shows a specific tree generated according to an embodiment of the present principles. In this embodiment, an original MIP problem has two continuous variables $x_1$ and $x_2$, and four integer variables $y_1$, $y_2$, $y_3$, and $y_4$. The generating section 110 generates a partially relaxed MIP by only relaxing integer variables $y_1$ and $y_2$ to continuous variables $y'_1$ and $y'_2$, and leaving $y_3$ and $y_4$ not relaxed, at step S400.

Then, the generating section 110 begins the branch-and-bound algorithm for the partially relaxed MIP problem. First, the generating section 110 generates two sub-problems by fixing the relaxed integer variable $y'_1$ to values "0" and "1." These two sub-problems are referred to as 1st layer sub-problems. Then, the generating section 110 generates two sub-problems from one or both of the 1st layer sub-problems by fixing the relaxed integer variable $y'_2$ to values "0" and "1." These two sub-problems generated from the 1st layer sub-problems are referred to as 2nd layer sub-problems.

The solver 120 solves each of the sub-problems, and the generating section 110 generates new sub-problem(s) based on the solution. In this embodiment, the 1st layer sub-problems have continuous variables $x_1$, $x_2$ and $y'_2$, and integer variables $y_3$ and $y_4$. The 2nd layer sub-problems have continuous variables $x_1$, and $x_2$, and integer variables $y_3$ and $y_4$.

The original MIP problem, the partially relaxed MIP problem, and the sub-problems all have continuous variables $x_1$ and $x_2$ and non-relaxed integer variables $y_3$ and $y_4$. Since the partially relaxed MIP problem is generated to be a Mixed Discrete Convex Programming problem, which can be solved by utilizing a local search algorithm or the like, the 1st layer sub-problems and 2nd layer sub-problems, which are also Mixed Discrete Convex Programming problems, can also be solved by the same method. If all continuous variables relaxed from integer variables in the solution of a sub-problem are integers, then the generating section 110 may cease branching of the sub-problem.

Figure 6:
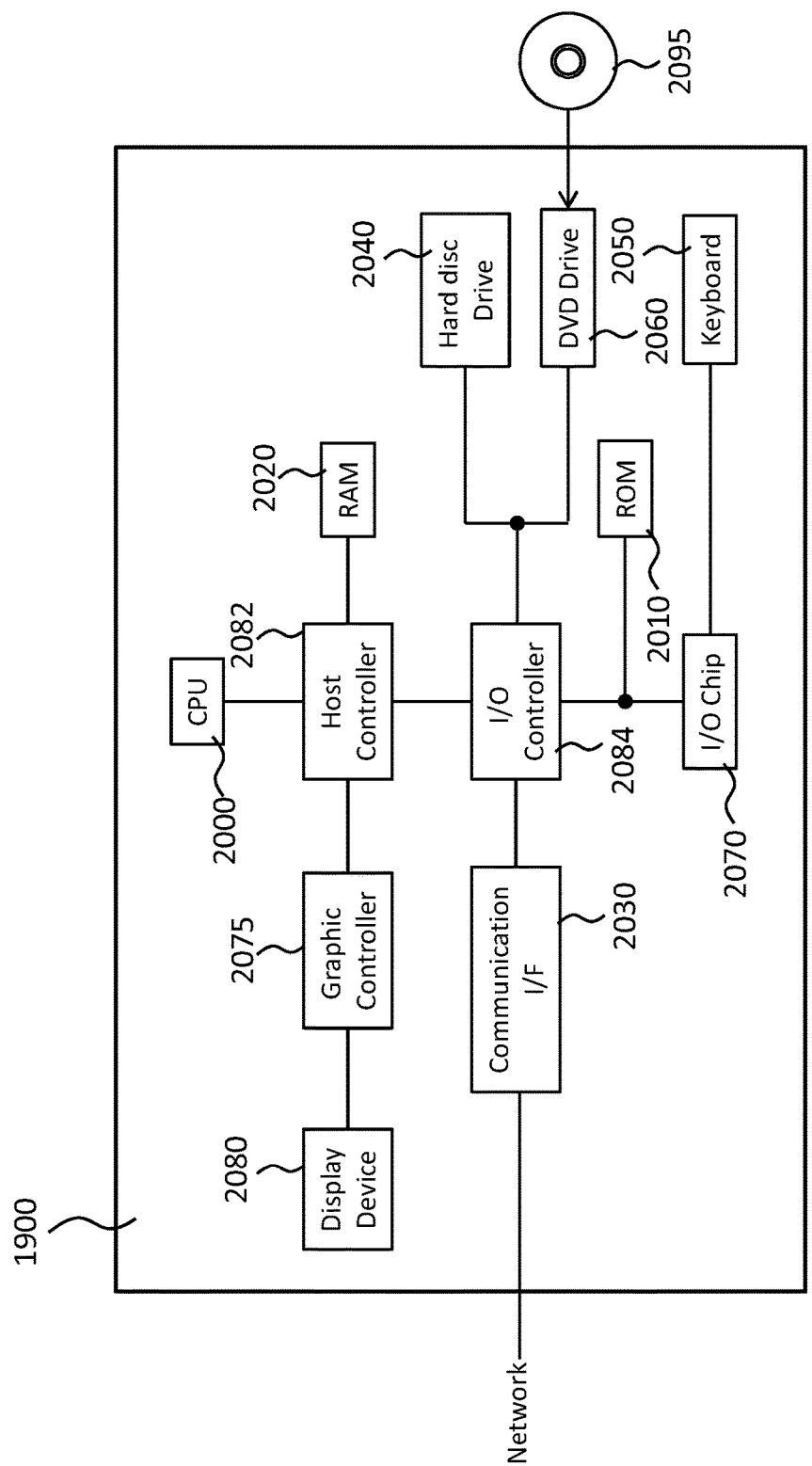
FIG. 6 shows an exemplary system for solving a mixed integer programming problem, according to an embodiment of the present principles.

FIG. 6 shows an exemplary system for solving a mixed integer programming problem. The exemplary configuration may be a computer 1900 according to an embodiment of the present principles. The computer 1900, according to the present embodiment, includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer 1900 also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which may access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as apparatus 10 of FIG. 1, includes a generating section module, a solver module, and a determining section module. The program or module acts on the CPU 2000, to cause the computer 1900 to function as a generating section, such as generating section 110, a solver, such as solver 120, and a determining section, such as a determining section 130.

The information processing described in these programs is read into the computer 1900, to function as a generating section 110, a solver 120, and a determining section 130 which are the result of cooperation between the program or module and the above-mentioned various types of hardware resources. Moreover, the apparatus 10 is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present principles are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present principles. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present principles has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the present principles.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present principles can be used to realize an apparatus, a computer-implemented method, and a computer program product.

While the embodiment(s) of the present principles has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention. All elements described above may not be necessary. Only a part of the elements may be used for implementing the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for solving a mixed integer programming problem comprising:
   a generating section configured to generate a relaxed mixed integer programming problem by relaxing only a portion of integer variables of the mixed integer programming problem to a continuous variable, wherein the generating section is further configured to generate a sub-problem of the relaxed mixed integer programming problem if a predicted range of an objective function of the sub-problem overlaps a required range of an objective function of the mixed integer programming problem;
   a solver configured to reduce solving time for the relaxed mixed integer programming problem by branching only relaxed portions of the integer variables using a branch-and-bound procedure; and
   a searching section configured to search, using a processor, an optimum solution of the mixed integer programming problem, using branches for only a portion of the integer variables, based on a solution of the relaxed mixed integer programming problem, and to determine an upper bound and a lower bound for each of one or more sub-problems, and to discard a sub-problem from the one or more sub-problems if a lower bound of the sub-problem is greater than an upper bound of other sub-problems from the one or more sub-problems.

2. The apparatus of claim 1, wherein the generating section is further configured to keep a predetermined number of the integer variables of the mixed integer programming problem not relaxed and relax at least one integer variable of the mixed integer programming problem to at least one continuous variable.

3. The apparatus of claim 2, wherein the generating section is further configured to keep less than four integer variables of the mixed integer programming problem not relaxed.

4. The apparatus of claim 3, wherein the generating section is further configured to keep one integer variable of the mixed integer programming problem not relaxed and relax other integer variables to continuous variables.

5. The apparatus of claim 1, wherein the solver is further configured to solve the relaxed mixed integer programming problem as a mixed discrete convex programming problem to require discrete convexity for each of at least one integer variables.

6. The apparatus of claim 1, wherein the determining section is further configured to determine that the solution of the relaxed mixed integer programming problem is the solution of the mixed integer programming problem if each of at least one continuous variable relaxed from each of at least one integer variable is calculated to be an integer value in the solution of the relaxed mixed integer programming problem.

7. The apparatus of claim 1, wherein:
the generating section is further configured to generate a sub-problem of the relaxed mixed integer programming problem which has fixed integer values for at least one integer variable relaxed to the continuous variable based on a value of a corresponding relaxed continuous variable in the solution of the relaxed mixed integer programming problem;
the solver is further configured to solve the sub-problem; and
the determining section is further configured to determine the solution of the mixed integer programming problem based on a solution of the sub-problem.

8. The apparatus of claim 7, wherein the generating section is further configured to generate the sub-problem if a predicted range of an objective function of the sub-problem overlaps a required range of an objective function of the mixed integer programming problem.

9. A method for solving a mixed integer programming problem comprising:
generating a relaxed mixed integer programming problem by relaxing only a portion of integer variables of the mixed integer programming problem to a continuous variable, wherein generating the relaxed mixed integer programming problem includes generating a sub-problem of the relaxed mixed integer programming problem if a predicted range of an objective function of the sub-problem overlaps a required range of an objective function of the mixed integer programming problem;
reducing solving time for the relaxed mixed integer programming problem by solving the relaxed mixed integer programming problem by branching only relaxed portions of the integer variables using a branch-and-bound procedure; and
searching, using a processor, an optimum solution of the mixed integer programming problem, using branches for only a portion of the integer variables, based on a solution of the relaxed mixed integer programming problem, the searching further comprising determining an upper bound and a lower bound for each of one or more sub-problems, and discarding a sub-problem from the one or more sub-problems if a lower bound of the sub-problem is greater than an upper bound of other sub-problems from the one or more sub-problems.

10. A computer program product comprising a non-transitory computer readable storage medium having program instructions embodied therewith, the program instructions executable by a computer to cause the computer to perform operations comprising:
generating a relaxed mixed integer programming problem by relaxing only a portion of integer variables of the mixed integer programming problem to a continuous variable, wherein generating the relaxed mixed integer programming problem includes generating a sub-problem of the relaxed mixed integer programming problem if a predicted range of an objective function of the sub-problem overlaps a required range of an objective function of the mixed integer programming problem;
reducing solving time for the relaxed mixed integer programming problem by solving the relaxed mixed integer programming problem by branching only relaxed portions of the integer variables using a branch-and-bound procedure; and
searching, using a processor, an optimum solution of the mixed integer programming problem, using branches for only a portion of the integer variables, based on a solution of the relaxed mixed integer programming problem, the searching further comprising determining an upper bound and a lower bound for each of one or more sub-problems, and discarding a sub-problem from the one or more sub-problems if a lower bound of the sub-problem is greater than an upper bound of other sub-problems from the one or more sub-problems.

11. The apparatus of claim 1, wherein the sub-problem has fixed integer values for at least one integer variable relaxed to the continuous variable based on a value of a corresponding relaxed continuous variable in the solution of the relaxed mixed integer programming problem.

12. The apparatus of claim 1, wherein the predicted range includes a range between a lower bound and an upper bound of the sub-problem and the required range includes a range between a lower bound and an upper bound of other sub-problems.

13. The apparatus of claim 12, wherein the generating section is further configured to discard the sub-problem when the lower bound of the sub-problem is greater than the upper bound of the other sub-problems.

\* \* \* \* \*